(12) United States Patent
Hsieh

(10) Patent No.: US 11,247,748 B1
(45) Date of Patent: Feb. 15, 2022

(54) BICYCLE PEDAL

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 0 days.

(21) Appl. No.: 17/346,291

(22) Filed: Jun. 13, 2021

(51) Int. Cl.
*B62M 3/08* (2006.01)
*B62M 3/00* (2006.01)

(52) U.S. Cl.
CPC ............ *B62M 3/086* (2013.01); *B62M 3/003* (2013.01)

(58) Field of Classification Search
None
See application file for complete search history.

(56) References Cited

U.S. PATENT DOCUMENTS

| 4,838,115 A * | 6/1989 | Nagano | B62M 3/08 74/594.4 |
| 2011/0061491 A1* | 3/2011 | Chin | B62M 3/08 74/594.4 |
| 2017/0096188 A1* | 4/2017 | Bigolin | B62M 3/086 |
| 2017/0101157 A1* | 4/2017 | Hsieh | B62M 3/086 |

\* cited by examiner

*Primary Examiner* — Vicky A Johnson

(57) ABSTRACT

A pedal includes a pedal body and a shaft. The pedal body has a shaft hole and a ball bearing disposed in the shaft hole. The ball bearing has an inner sleeve and an outer sleeve. The shaft has a locking end with a large diameter and a pivoting end with a small diameter. The pivoting end has a thread section screwed by a fixing nut which presses the inner sleeve of the ball bearing. The outer sleeve is fixed by a cap mounted in an opening of the shaft hole. The shaft is received in the shaft hole and fixed by the fixing nut. The shaft axially passes through the ball bearing. An end of the fixing nut is integrally formed with a flange to press the inner sleeve.

3 Claims, 7 Drawing Sheets

BICYCLE PEDAL

BACKGROUND

Technical Field

The invention relates to bicycles, particularly to bicycle pedals.

Related Art

A current fixing structure of a pedal and a shaft as shown in FIG. 7 includes a pedal body 10 and a shaft 20. The pedal body 10 is formed with a shaft hole 11. The shaft hole 11 is provided with at least one bearing 30. The bearing 30 located at the ends of the pedal body 10 and the shaft 20 is a ball bearing. The shaft 20 includes a locking end 21 having a large diameter and a pivoting end 22 having a small diameter. The pivoting end 22 has a thread section 220 to allow a fixing nut 40 to fasten the shaft 20 into the pedal body 10. A washer 50 is placed between the fixing nut 40 and the bearing 30 to offer better fixture stability. However, when assembling, the washer 50 is not easy to be placed in the shaft hole 11 because of its small size. Furthermore, the washer 50 may be uneven to affect the stability and smoothness between the shaft 20 and the pedal body 10. That is a problem to be solved.

SUMMARY

An object of the invention is to provide an improved bicycle pedal, which can simplify the assembling process of the pedal and avoid the drawback of unevenness of a conventional washer.

To accomplish the above object, the improved bicycle pedal includes a pedal body and a shaft. The pedal body has a shaft hole and a ball bearing disposed in the shaft hole. The ball bearing has an inner sleeve and an outer sleeve. The shaft has a locking end with a large diameter and a pivoting end with a small diameter. The pivoting end has a thread section screwed by a fixing nut which presses the inner sleeve of the ball bearing. The outer sleeve is fixed by a cap mounted in an opening of the shaft hole. The shaft is received in the shaft hole and fixed by the fixing nut. The shaft axially passes through the ball bearing. An end of the fixing nut is integrally formed with a flange to press the inner sleeve.

DETAILED DESCRIPTION

Figure 1:
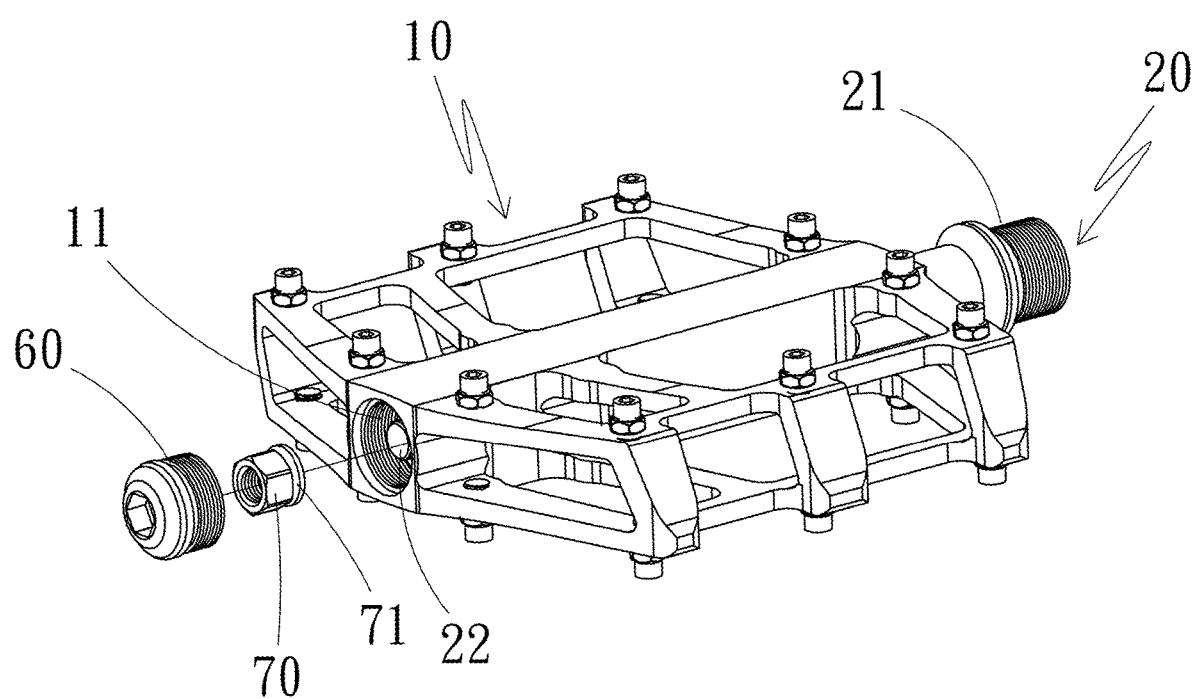
FIG. 1 is a partially assembled view of the invention.
Figure 2:
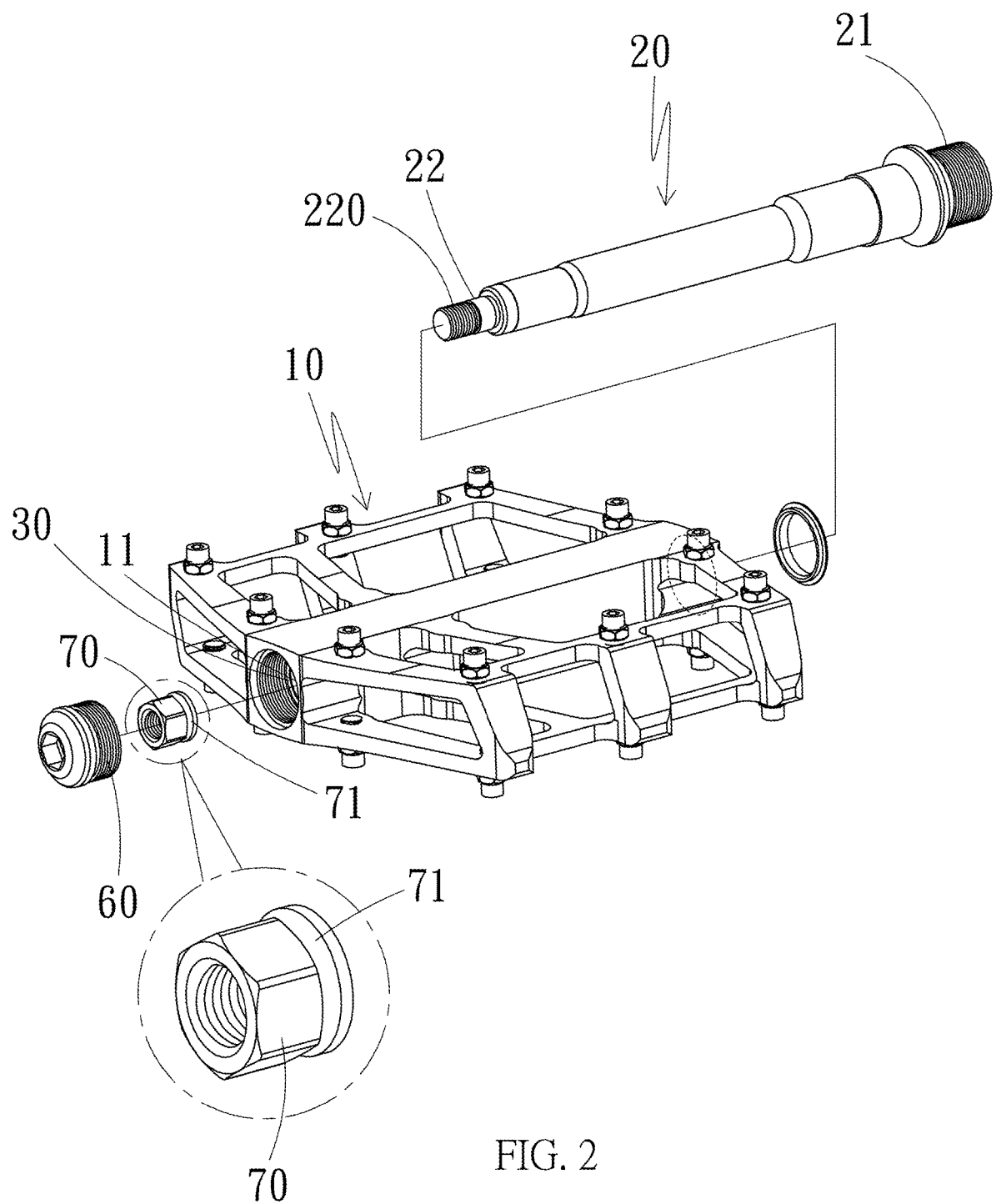
FIG. 2 is an exploded view of the invention.
Figure 3:
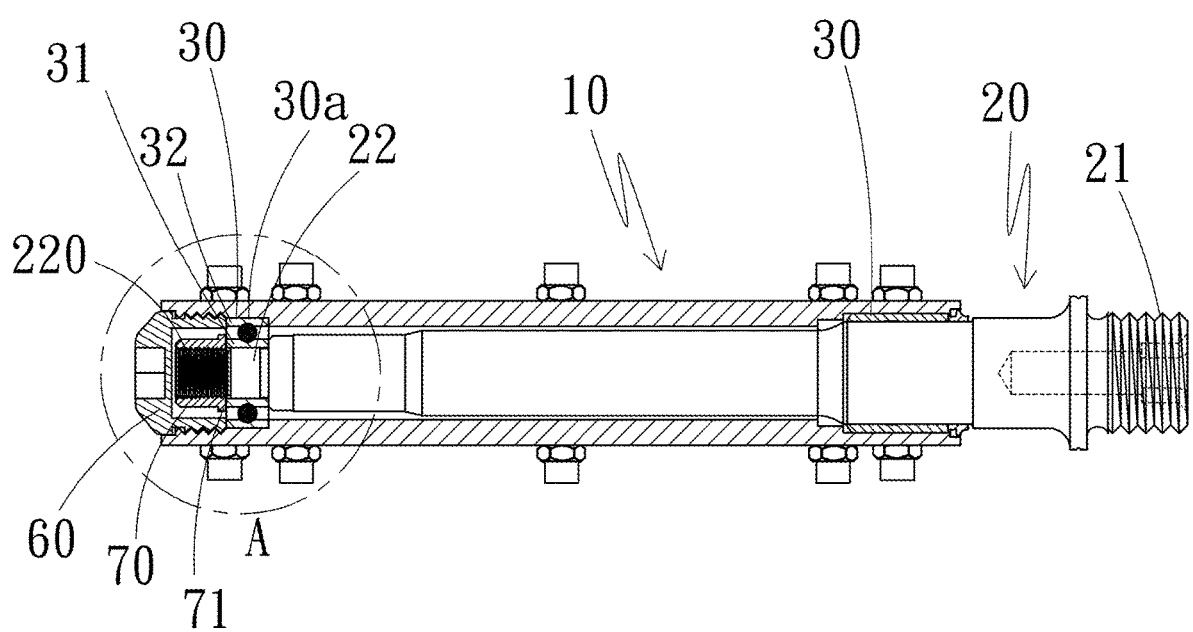
FIG. 3 is a cross-sectional view of the invention.
Figure 4:
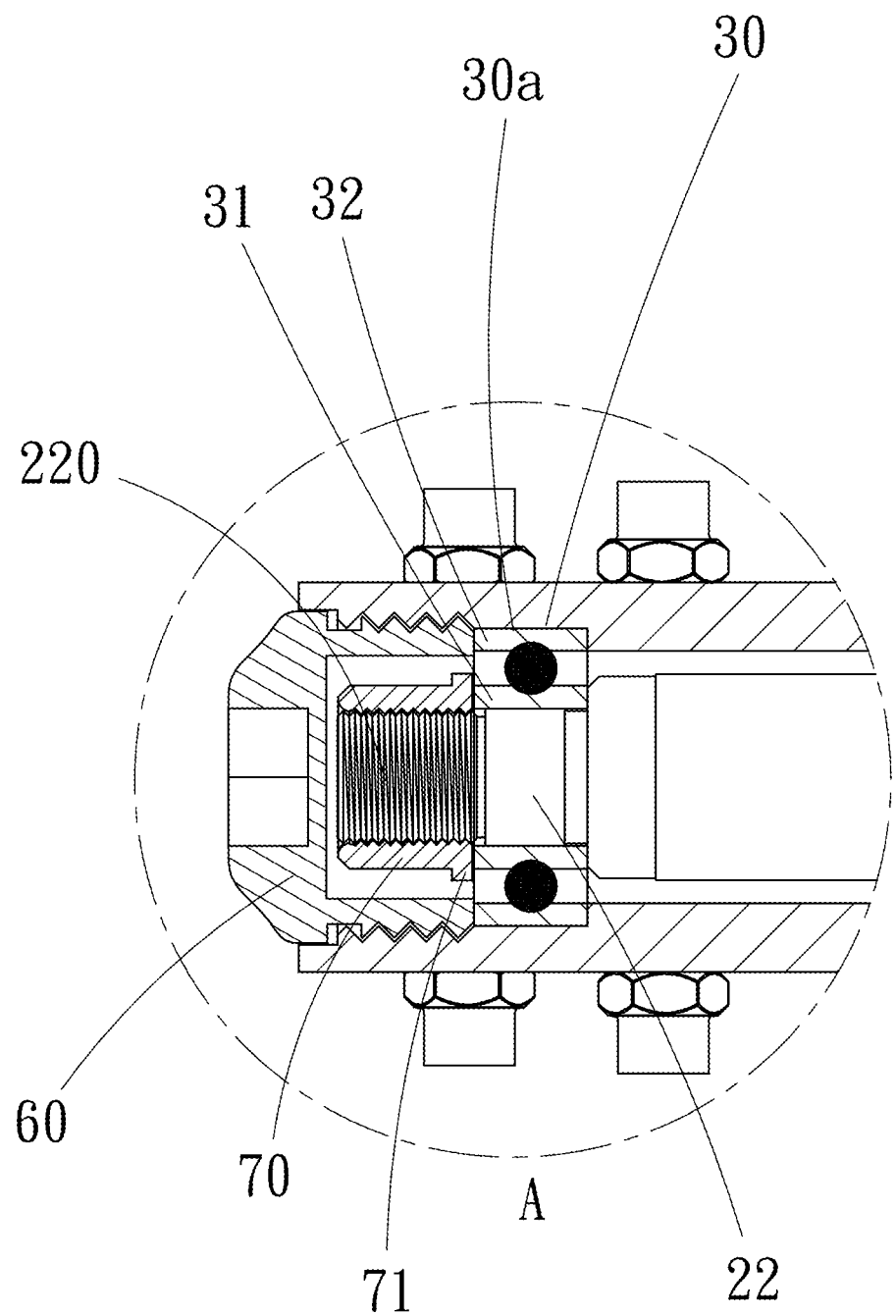
FIG. 4 is a partially enlarged cross-sectional view of the invention.

Please refer to FIGS. 1-4. The improved bicycle pedal of the invention includes a pedal body 10 and a shaft 20. The pedal body 10 has a shaft hole 11 and a bearing 30 disposed in the shaft hole 11. The bearing 30 on outer ends of the pedal body 10 and the shaft 20 is a ball bearing 30a. The ball bearing has an inner sleeve 31 and an outer sleeve 32. The shaft 20 has a locking end 21 with a large diameter and a pivoting end 22 with a small diameter. The pivoting end 22 has a thread section 220 screwed by a fixing nut 70 which presses the inner sleeve 31 of the ball bearing 30a so that the shaft 20 is rotatably fixed in the pedal body 10. The outer sleeve 32 is fixed by a cap 60 mounted in an opening of the shaft hole 11. An end of the fixing nut 70 is integrally formed with a flange 71 to press the inner sleeve 31 of the ball bearing 30a.

When the shaft 20 is assembled in the shaft hole 11 of the pedal body 10, the shaft 20 passes through the ball bearing 30a at an end of the shaft hole 11 and then the fixing nut 70 is screwed to fix. The flange 71 having a larger diameter presses the inner sleeve 31 of the ball bearing 30a.

Figure 5:
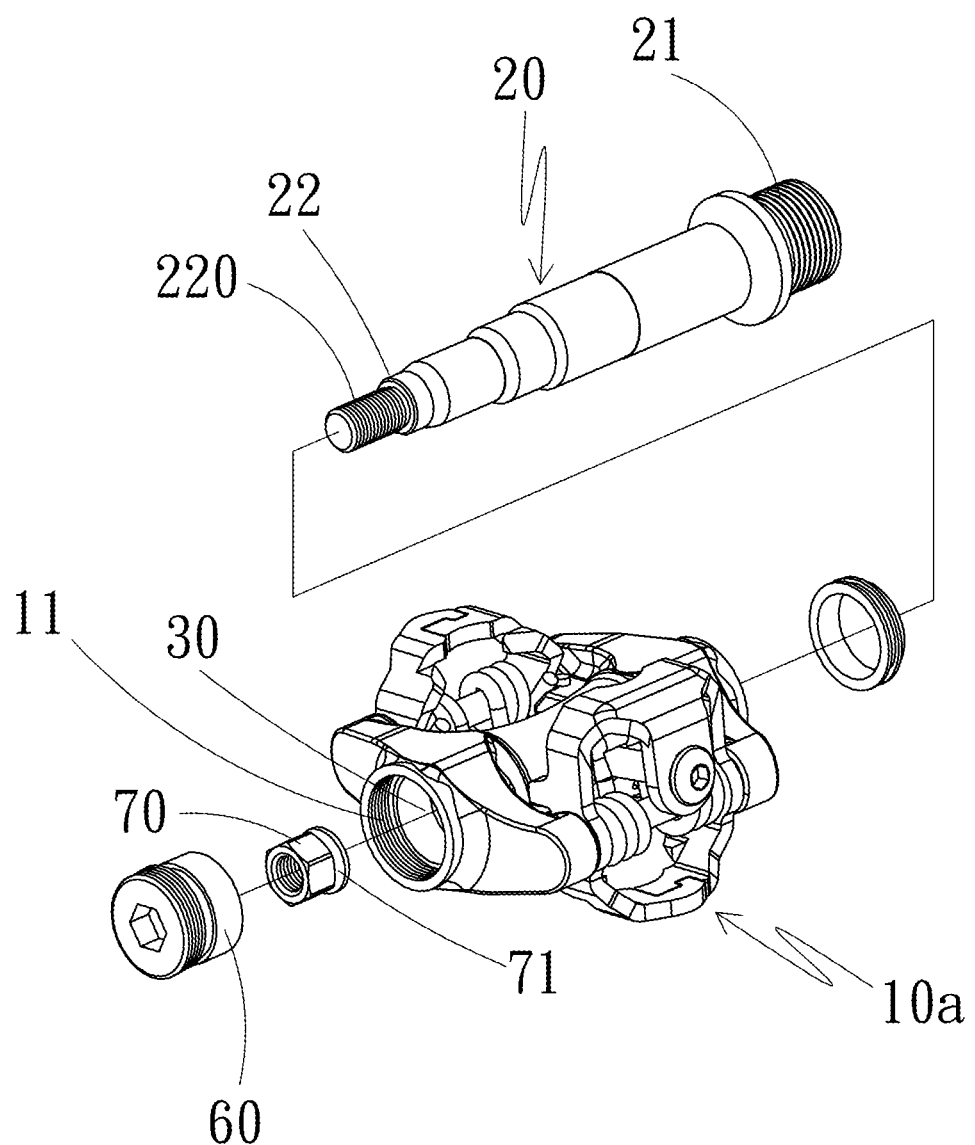
FIG. 5 is a schematic view of the invention applied in a mountain-bike-type pedal.
Figure 6:
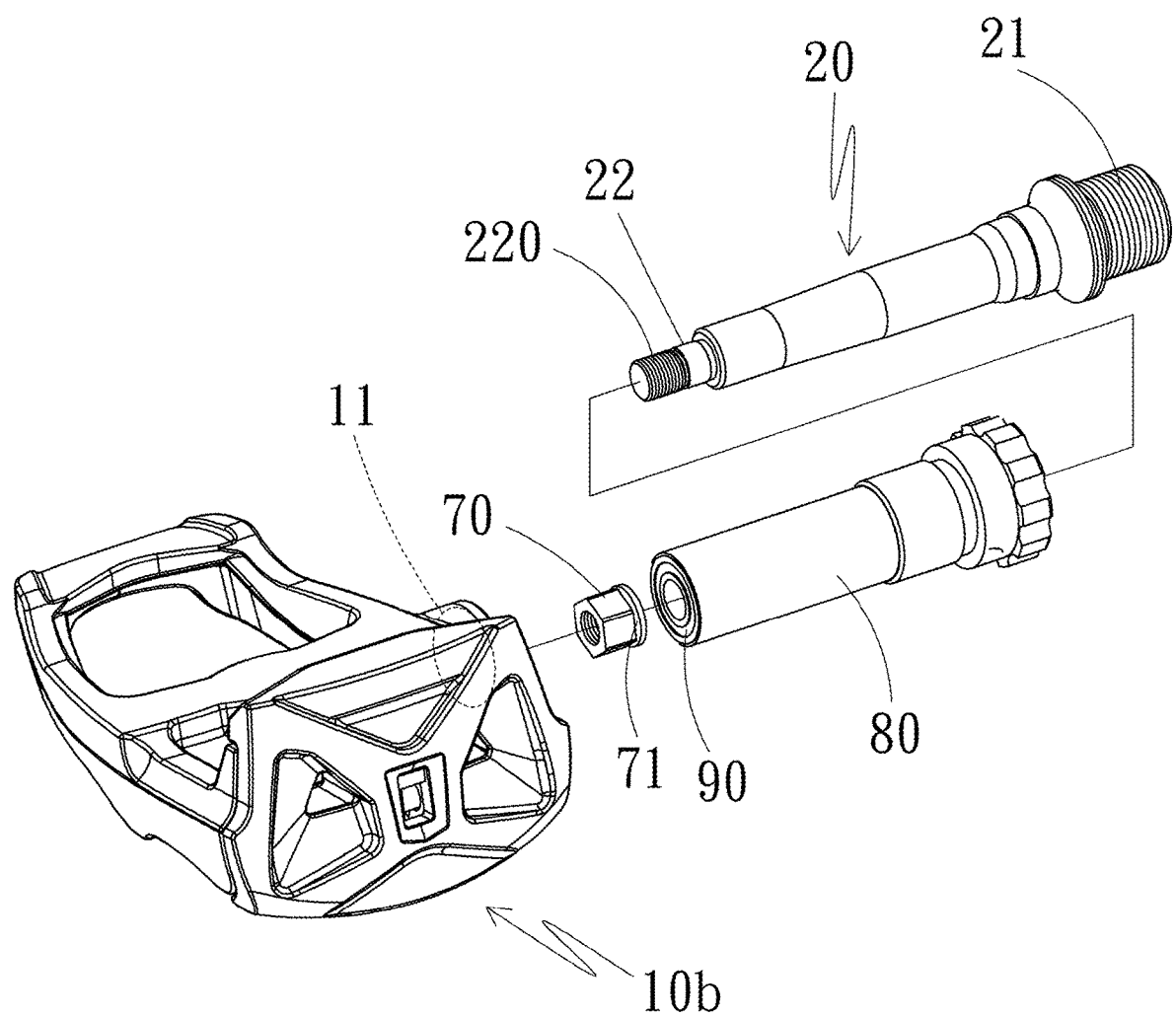
FIG. 6 is a schematic view of the invention applied in a road-bike-type pedal.
Figure 7:
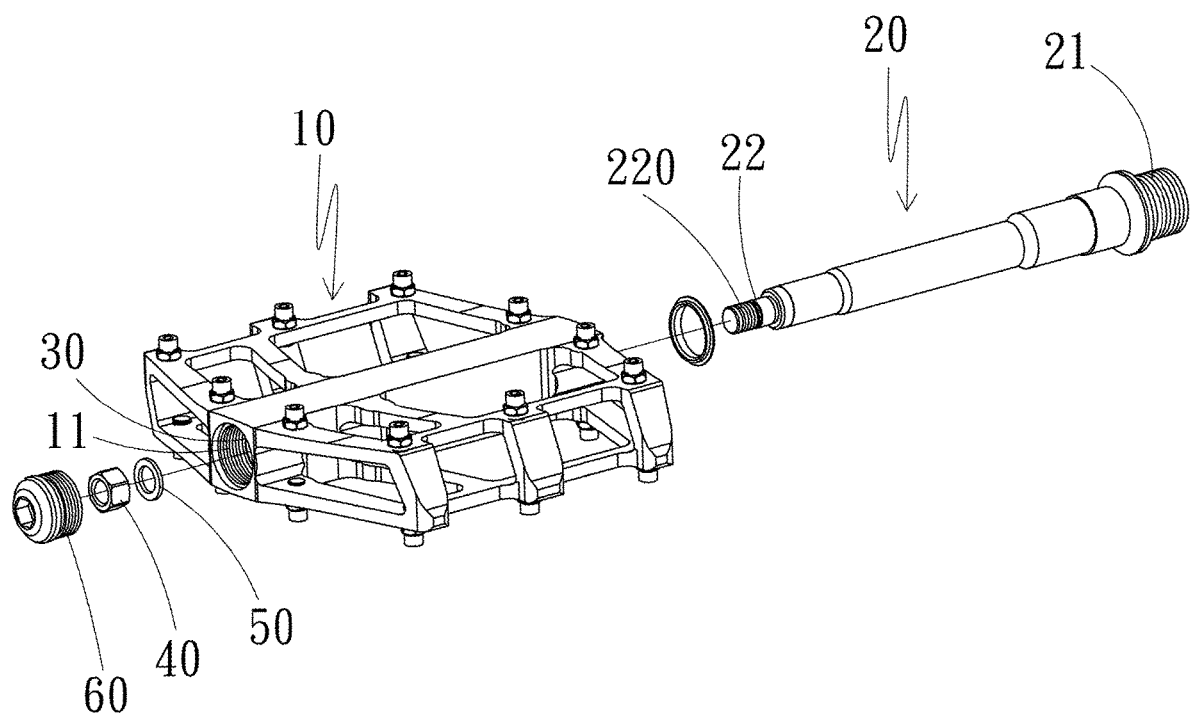
FIG. 7 is an exploded schematic view of a conventional pedal.

FIG. 5 is a schematic view of the invention applied in a mountain-bike-type pedal and FIG. 6 is a schematic view of the invention applied in a road-bike-type pedal. The mountain-bike-type pedal has a pedal body 10a with two sets of cleat fasteners. The road-bike-type pedal has a pedal body 10b with a set of cleat fasteners. The pedal body 10b is formed with a shaft hole 11 which does not completely penetrate through the pedal body 10b. The shaft hole 11 is disposed with a bushing 80. At least one bearing is provided in the bushing 80. The bearing on outer end of the bushing 80 is a ball bearing 90. The shaft 20 axially passes through the bushing 80 to expose the thread section 220 on the pivoting end 22 with a small diameter. The fixing nut 70 is screwed on the thread section 220 to press the inner sleeve of the ball bearing 90 with the flange 71 so that the bushing 80 and the shaft 90 can be fixed.

In the embodiment, the fixing nut 70 is a hex nut, and the flange 71 of the fixing nut 70 is circular disk.

The improved pedal of the invention has the following functions:

1. The fixing nut 70 is integrally formed with the flange 71, so no washer 50 is needed to be placed between the fixing nut 40 and the ball bearing 30a. This can effectively simplify the assembling process of pedals.

2. The flange integrally formed on the fixing nut 70 will not cause unevenness. This can enhance the structural stability.

While this disclosure has been described by means of specific embodiments, numerous modifications and variations could be made thereto by those skilled in the art without departing from the scope and spirit of this disclosure set forth in the claims.

What is claimed is:

1. A bicycle pedal comprising:
    a pedal body, having a shaft hole and a ball bearing disposed in the shaft hole, the ball bearing comprising an inner sleeve and an outer sleeve, and the outer sleeve being fixed by a cap mounted in an opening of the shaft hole; and
    a shaft, received in the shaft hole, axially passing through the ball bearing, comprising a locking end with a large diameter and a pivoting end with a small diameter, and the pivoting end having a thread section screwed by a fixing nut which presses the inner sleeve of the ball bearing;
    wherein an end of the fixing nut is integrally formed with a flange which only presses the inner sleeve without directly pressing the outer sleeve.

2. The bicycle pedal of claim 1, wherein the fixing nut is a hex nut.

3. The bicycle pedal of claim 2, wherein the flange is a circular disk.

\* \* \* \* \*